United States Patent
Bhalla

(10) Patent No.: US 10,349,230 B2
(45) Date of Patent: Jul. 9, 2019

(54) GROUP COMMUNICATION WITH CONFIGURABLE GEOGRAPHIC SERVICE AREA

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/909,067

(22) PCT Filed: Aug. 1, 2014

(86) PCT No.: PCT/CN2014/083581
§ 371 (c)(1),
(2) Date: Jan. 29, 2016

(87) PCT Pub. No.: WO2015/014317
PCT Pub. Date: Feb. 5, 2015

(65) Prior Publication Data
US 2016/0165413 A1 Jun. 9, 2016

Related U.S. Application Data

(60) Provisional application No. 61/861,186, filed on Aug. 1, 2013.

(51) Int. Cl.
*H04W 4/08* (2009.01)
*H04W 4/02* (2018.01)
*H04W 4/90* (2018.01)

(52) U.S. Cl.
CPC ............. *H04W 4/08* (2013.01); *H04W 4/02* (2013.01); *H04W 4/90* (2018.02)

(58) Field of Classification Search
None
See application file for complete search history.

(56) References Cited

U.S. PATENT DOCUMENTS

2007/0081481 A1* 4/2007 Cai .................. H04W 52/327
370/312
2010/0248742 A1 9/2010 Song et al.
(Continued)

FOREIGN PATENT DOCUMENTS

| CN | 1968110 A | 5/2007 |
| CN | 101360275 A | 2/2009 |

(Continued)

OTHER PUBLICATIONS

ZTE, S2-132506, MuSe with Configurable Geographic Service Area, SA WG2 Meeting #98 Jul. 15-19, 2013, Valencia, Spain.*
(Continued)

*Primary Examiner* — German Viana Di Prisco
(74) *Attorney, Agent, or Firm* — Perkins Coie LLP

(57) ABSTRACT

A Group Communication Service Enabler (GCSE) controls the formation of a group service and access by mobile devices to the group service based of geographic region restriction associated with the group service. A mobile device may be able to override the geographic restriction. As mobile devices join and leave the group service and roam from cell to cell, the wireless resources used by the group service are adjusted by creating or modifying transmission the associated multimedia broadcast/multicast service (MBMS).

22 Claims, 8 Drawing Sheets

(56) References Cited

U.S. PATENT DOCUMENTS

| | | | |
|---|---|---|---|
| 2011/0305183 A1* | 12/2011 | Hsu | H04W 72/005 |
| | | | 370/312 |
| 2012/0093060 A1* | 4/2012 | Huschke | H04W 48/12 |
| | | | 370/312 |
| 2012/0246244 A1 | 9/2012 | Mallet et al. | |
| 2013/0007287 A1* | 1/2013 | Chu | H04L 12/189 |
| | | | 709/227 |
| 2014/0057645 A1* | 2/2014 | Chowdhary | H04W 4/08 |
| | | | 455/456.1 |
| 2014/0064177 A1* | 3/2014 | Anchan | H04W 4/08 |
| | | | 370/312 |
| 2014/0133332 A1* | 5/2014 | Lee | H04W 88/04 |
| | | | 370/252 |
| 2014/0177506 A1* | 6/2014 | Korus | H04W 4/06 |
| | | | 370/312 |
| 2015/0230063 A1* | 8/2015 | Chandramouli | H04W 4/005 |
| | | | 455/466 |
| 2016/0050544 A1* | 2/2016 | Chandramouli | H04L 12/1845 |
| | | | 370/312 |

FOREIGN PATENT DOCUMENTS

| | | |
|---|---|---|
| CN | 102075456 A | 5/2011 |
| TW | M452559 U | 5/2013 |

OTHER PUBLICATIONS

3GPP TS 22.468 v12.0.0 (Jun. 2013).*
3GPP TR 23.768 v0.2.0 (Jun. 2013).*
3GPP SA WG2 Meeting #98, "MuSe with Configurable Geographic Service Area," S2-133032, Valencia, Spain, pp. 1-7, Jul. 2013.
3GPP Technical Specification, "3rd Generation Partnership Project; Technical Specification Group Services and System Aspects; Study on architecture enhancements to support Group Communication System Enablers for LTE (GCSE_LTE) (Release 12)," TR 23.768 v0.2.0, 25 pages, Jun. 2013.
Extended Search Report dated May 11, 2016 for European Application No. 14831635.9, filed on Aug. 1, 2014 (10 pages).
International Search Report and Written Opinion dated Oct. 29, 2014 for International Application No. PCT/CN2014/083581, filed on Aug. 1, 2014 (8 pages).

* cited by examiner

GROUP COMMUNICATION WITH CONFIGURABLE GEOGRAPHIC SERVICE AREA

CROSS REFERENCE TO RELATED APPLICATION

This patent document claims the benefit of priority of U.S. Provisional Patent Application No. 61/861,186, filed on Aug. 1, 2013. The entire content of the before-mentioned patent application is incorporated by reference herein.

BACKGROUND

This application relates to wireless communications.

Wireless cellular networks today provide coverage to almost all areas where humans can reach. Even in remote areas, it is not uncommon to find wireless signals for data and voice communication. Due to the universal cellular network coverage and the proliferation of wireless devices, often mobile phones are used by public as a way to communicate in case of natural disasters or emergencies. Emergency personnel such as police and fire fighters also may communicate with each other and with the public using the available cellular telephony infrastructure.

SUMMARY

A Group Communication Service Enabler (GCSE) controls the formation of a group service and access by mobile devices to the group service based on a geographic region restriction associated with the group service. A mobile device may be able to override the geographic restriction. As mobile devices join and leave the group service and roam from cell to cell, the wireless resources used by the group service are adjusted by creating or modifying transmission of the associated multimedia broadcast/multicast service (MBMS).

In one aspect, a method implemented at a network-side server in a wireless communication network is disclosed. The method includes establishing a group communication service based on a first request received from a first user equipment, wherein the establishing the group communication service is responsive to a geographic information associated with the request, exchanging messages with a first server in the wireless communication network to assign transmission resources to the group communication service and managing a second user equipment's subscription to the group communication service.

In another aspect, a communication system that includes a plurality of mobile device in a geographic region and a group communication service enabler (GCSE) is disclosed. The GCSE is configured to establish a group communication service to serve the plurality of mobile devices in the geographic region, control entry of a new mobile device to the group communication service based on a qualification of the new mobile device, and assign wireless transmission resources to the group communication service.

These, and other, aspects are further described below with reference to the drawings.

DETAILED DESCRIPTION

Figure 1:
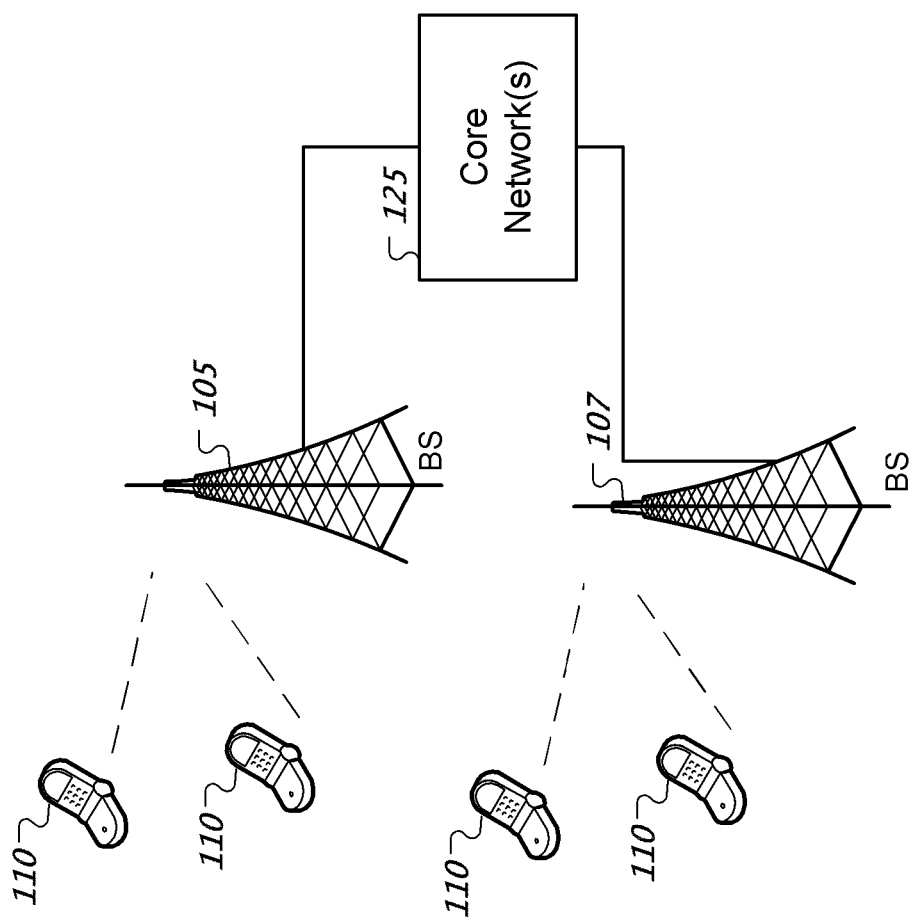
FIG. 1 shows an example of a wireless communication system.

A Group Communication Service (GCS) may provide a mechanism to distribute the same content to multiple users in a controlled manner. Similar group communications are used in the typical Land Mobile Radio (LMR) systems. LMR systems mostly provide "Push to Talk" (PTT) type of services with such group communications enabling PTT voice communications.

Some popular mobile applications, such as Twitter and WhatsApp, provide application-layer connectivity to a group of users, by which, one user can transmit his messages (audio/text/image) to a group of users. These technologies, however, lack a notion of a geographical association of the group. Furthermore, because the groups are formed at application layer, typically at the web servers operated by Twitter and WhatsApp, the actual messaging to multiple wireless users within the same cell occurs on unicast messages to the users, thereby un-necessarily wasting the wireless bandwidth.

It will be beneficial for a GCS to have flexible modes of operation. For example, a user may want to subscribe to various GCS based on the content type, such as conversational type communication (e.g., voice, video) or streaming (e.g., video) or data (e.g., messaging) or a combination of them. Such services can also allow users to participate in several groups at the same time, in parallel; e.g., voice to one group, different streams of video or data to other groups etc. Furthermore, in some applications, a group may have to be formed on a temporary basis, e.g., when responding to disasters such as fire, earthquake and so on, and then terminated after the need for the group is passed. In one example scenario, firefighters or police assembled at a scene of disaster may form a service group based on their geographic location. Other fire fighters, who are not at the scene, may automatically be excluded from this group to conserve the communication bandwidth. Optionally, some fire fighters (e.g., fire chief) may be included by overruling the geographic restrictions.

Using the techniques described in the present document, the end-users of GCS enabled services may be organized into Groups (GCSE Group). The End-users (e.g., end users using user devices) can be member of more than one group, with corresponding GCSE Group ID(s) preconfigured at each user device. These end-users then could become Group Member of the respective GCSE groups. In some embodiments, GCSE groups, by default, may be of a system wide scope implying that users of GCSE services can be located anywhere where operator services are available.

The present document provides methods and apparatus that can be deployed within the communication networks, such as the 3GPP and 3GPP2 networks, for configuring the geographical scope of GCSE communications. The capabilities associated with the Geographical Scope of GCSE communications include techniques to restrict group communications for a GCSE Group to a defined geographic area (e.g., the Group Members are able to receive and/or transmit only within this geographic area, techniques to redefine the geographic area for a GCSE group, and techniques for realizing capabilities associated with the Geographical Scope of GCSE communications. These, and other aspects, are further described herein.

Several organizations such as the 3GPP (3rd Generation Partnership Project) and 3GPP2 (Third Generation Partnership Project 2) are developing solutions for supporting group communications services over Long Term Evolution (LTE), Evolved Universal Terrestrial Radio Access (LTE/E-UTRAN) and cdma2000 technologies for Public Safety and other commercial applications. The term "GCSE" (Group Communication System Enabler) is used to refer to such Group Communication capabilities in the respective networks. In actual implementations, GCSE may refer to a service, software module(s) and/or hardware platform(s). While, for the sake of illustration, various techniques are discussed in this document with reference to the 3GPP EPS (Evolved Packet Core) networks, similar techniques are applicable for other communication networks as well.

FIG. 1 shows an example of a wireless communication system. A wireless communication system can include one or more base stations (BSs) 105a, 105b, one or more wireless devices 110a, 110b, 110c, 110d, and an access network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110a, 110b, 110c and 110d. A first base station 105a can provide wireless service based on a first radio access technology, whereas a second base station 105b can provide wireless service based on a second radio access technology. The base stations 105a and 105b may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
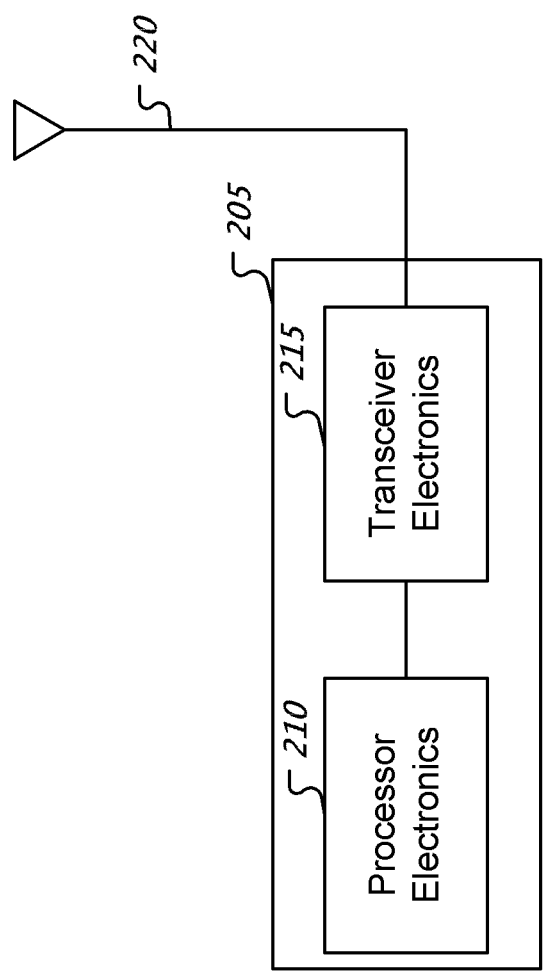
FIG. 2 shows an example of a radio station architecture.

FIG. 2 is a block diagram representation of a portion of a radio station 205. A radio station 205 such as a base station or a wireless device can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. In some embodiments, at least some of the disclosed techniques, modules or functions are implemented using the radio station 205.

Figure 3:
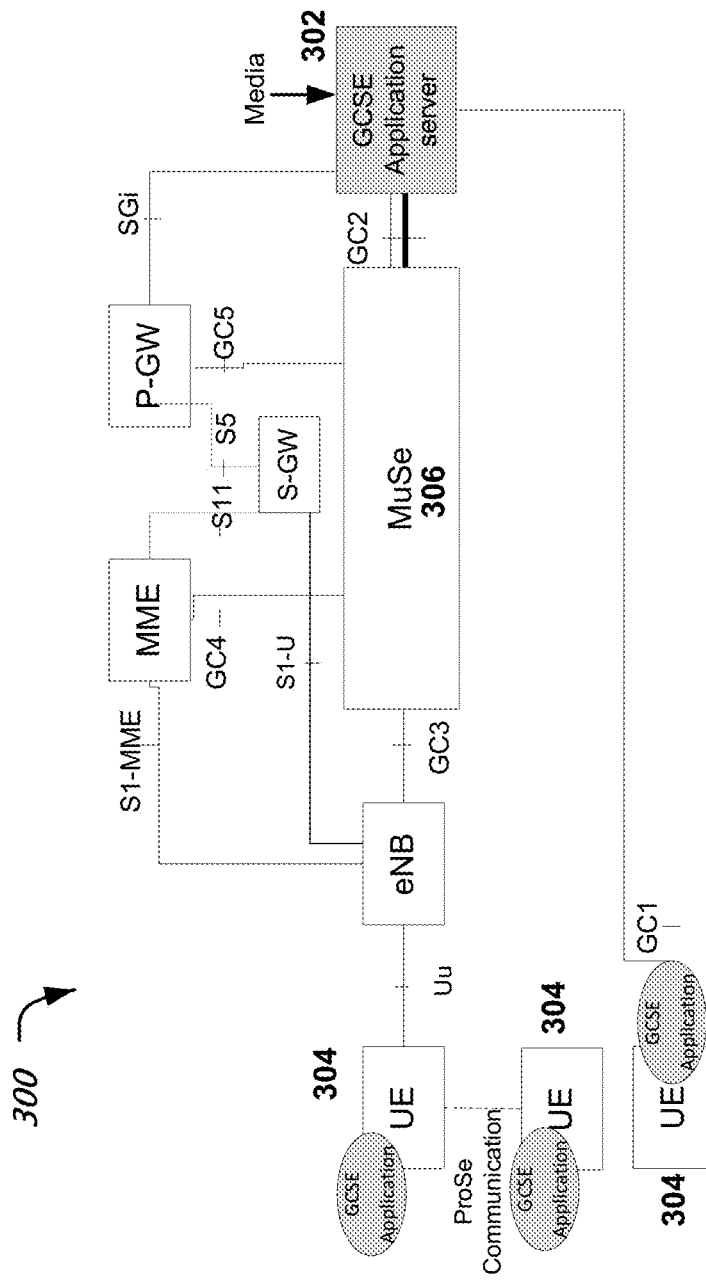
FIG. 3 shows an example of a wireless network offering configurable group communication services.

FIG. 3 illustrates an example of a simplified architectural view of the 3GPP EPS 300 for providing GCSE services.

This high level architecture view consists of Application Layer and 3GPP EPS layer. The Application Layer includes a GCSE Application Server (GCSE AS) 302 and the GCSE Application client 304 in user equipment similar to UE 110 in FIG. 1. The 3GPP EPS layer also includes a MuSe (Multipoint Service) function 306 that interworks with other functions provided by a 3GPP LTE network. The GCSE AS 302 and the MuSe function 306 may, e.g., be located in the core network 125.

Reference point GC1 is the reference point between the GCSE application in the UE and the GCSE AS 302. It may be used to define application level signaling required for enabling MuSe functionality for GCSE services. Reference point GC2 is the reference point between the GCSE AS 302 and the MuSe function. It may be used to define the interaction between the GCSE AS 302 and the MuSe function provided by the 3GPP EPS layer.

The GCSE Users (e.g., Public Safety Personnel, Dispatch Services) have the capability to configure the Geo Service Areas for each GCSE Group within which group communication services are to be provided. The geographical scope for each GCSE group may be agreed to between the Users and the GCSE AS provider as part of the subscription for the GCSE group. Such geographic scope of the GCSE group can also be reconfigured by the User.

Techniques further disclosed below enable the GCSE AS providers to have a relationship with the 3GPP system operator whereby Geo Service Areas have a predefined mapping with the corresponding 3GPP EPS MBMS (Multimedia Mulitcast and Broadcast Service) Service Areas, such as in terms of the lists of MBMS Service Areas. For example a Geo Service Area may comprise of sub-Areas A, B, C . . . , each of which is pre-mapped to a corresponding List A, List B, List C of MBMS Service Area Identities (MBMS SAIs). The mapping of the Geo Service Areas to 3GPP system operator EPS specific MBMS Service Areas may be done by appropriate configurations within the EPS, for example at the HSS (home subscriber server) and/or at the PCRF (policy and charging rules function) entities. These configurations ensure that the MBMS Service Areas are not larger than the corresponding Geo Service Areas. With such configurations, GCSE group communication is provided to the UEs by using a combination of unicast and multicast services.

When the geographic scope of a GCSE group in reconfigured, for example when a Geo Service Area comprising of sub-Areas A, B and C is reconfigured to sub-Areas A, B and D etc., appropriate mapping of the new Geo Service Area to the corresponding new MBMS Service Areas is provided by the 3GPP EPS.

For a GCSE Group with a defined Geo Service Area, Group communication is usually possible only between Transmitting and Receiving Members that are located within the Geo Service Area. One method that enables such capabilities is as follows:

When a UE 304 requests Registration with the GCSE AS 302 for participating in group communications, the UE 304 passes its geographic location (e.g., in terms of Geo Area A, Area B etc. that is understood by the GCSE AS 302) to the GCSE AS 302.

As an alternative, the GCSE AS 302 obtains location information for the requesting UE from the 3GPP EPS.

In some embodiments, the UE 304 passes its geographic location to the GCSE AS 302 during Group registration procedures along with the Group ID for the GCSE group. This does not preclude the possibility for the GCSE AS 302 to obtain the location information of the UE 304 from the 3GPP EPS in case such location information is not received from the UE. Once it knows the geographic location of a UE 304, the GCSE AS 302 validates that the requesting UE 304 is located within the Geo Service Area for the requested Group ID before granting the request. In one advantageous aspect, the validation of the location of the requesting UEs ensures that the Transmitting and Receiving Members are located within the configured Geo Service Areas. On successful validation, the GCSE AS 302 returns parameters for identifying the MBMS (Multimedia Broadcast Multicast Service) transmission for the Group e.g., the TMGI (Temporary Mobile Group Identity) for the Group and the associated MBMS Service Area information to the UE 304. This way, a UE 304 will know when it moves out of the configured MBMS Service Area.

When a group communication starts, such as when a group member makes a Floor Request, the GCSE AS 302 sets up multicast and/or unicast bearers for all registered members of the GCSE Group. Such bearers are used for the downlink (DL) delivery of the group communication transmission to all the Receiving Group Members. In addition, uplink (UL) bearer is also established for the Transmitting Group Member (the member that made the Floor Request) for sending the UL media that is to be distributed to all registered group communication members.

For the setting up unicast bearers, the GCSE AS 302 restricts the setup of such bearers only for the UEs that are located within the configured Geo Service Area.

In order to setup multicast (MuSe/MBMS) bearers, the GCSE AS 302 passes MBMS Service Area information corresponding to the Geo Service Area of interest to the MuSe function 306 over GC2 reference point. The EPS sets up appropriate MBMS bearers that are restricted to such MBMS service area.

In some embodiments, group communications is supported for "mobile" group members as well. For the case of DL group communications via MBMS bearers, a UE 304 moving to a new location acquires the MBMS transmission for the Group of interest at the new location (such as by monitoring the group TMGI information being transmitted by the 3GPP EPS), and continues receiving DL Group Communication. Upon losing MBMS transmission as it is moving, a UE 304 can notify the GCSE AS 302 of its new location. After verifying that the new location of the UE 304 is within the configured Geo Service Area or that the UE 304 is authorized to continue in this group communication from the new location, the GCSE AS 302 sets up a unicast bearer for the UE 304 and DL communications can continue. Else, a notification can be sent to the requesting entities informing that the group member has moved out of the service area.

Yet another method enables the system to override the geographic area restrictions for a particular group communication transmission for a GCSE Group for its Receiving Members. As per this method:

A Transmitting Member initiates Modify Geo Area Request to the GCSE AS 302 that includes parameters such as "override location:abc". Alternatively, an override of the service area for the Receiving Members can be initiated by the "dispatcher" entity at the GCSE AS 302. On validating that the group member is authorized to make such a request, the GCSE AS 302 passes to the MuSe/MBMS function in the 3GPP EPS (over GC2 reference point) the new/override MBMS Service Area information applicable the group communication transmissions that follow.

The 3GPP EPS then sets up MBMS bearers in the MBMS service area identified by the new/override MBMS Service Area information received from the GCSE AS 302.

For override service areas that are not covered by MBMS bearers, the GCSE AS 302 sets up unicast bearers for DL group communication transmission.

Yet another technique enables the system to restrict a particular group communication transmission to a sub-geo service area within the Geographical Service Area of that group. In this case, only the Receiving Members that are within the sub-geo service area receive the group communication. The method may work as follows.

A Transmitting Member initiates Modify Geo Area Request to the GCSE AS 302 that includes parameters such as "filter location:abc". Alternatively, a "filter" of the service area for the Receiving Members can be initiated by the "dispatcher" entity at the GCSE AS 302. On validating that the group member is authorized to make such a request, the GCSE AS 302 passes to the MuSe/MBMS function in the 3GPP EPS (over GC2 reference point) the new/filtered MBMS Service Area information applicable the group communication transmissions that follow.

The 3GPP EPS limits setting up of the MBMS bearers to the MBMS service area identified by this filter MBMS Service Area.

For filtered service areas not covered by MBMS bearers, the GCSE AS 302 sets up unicast bearers for DL transmission. Filtering may be performed to include a sub-geographic area or exclude a sub-geographic area.

Group Communication Within Configured Geographic Service Area

Figure 4A:
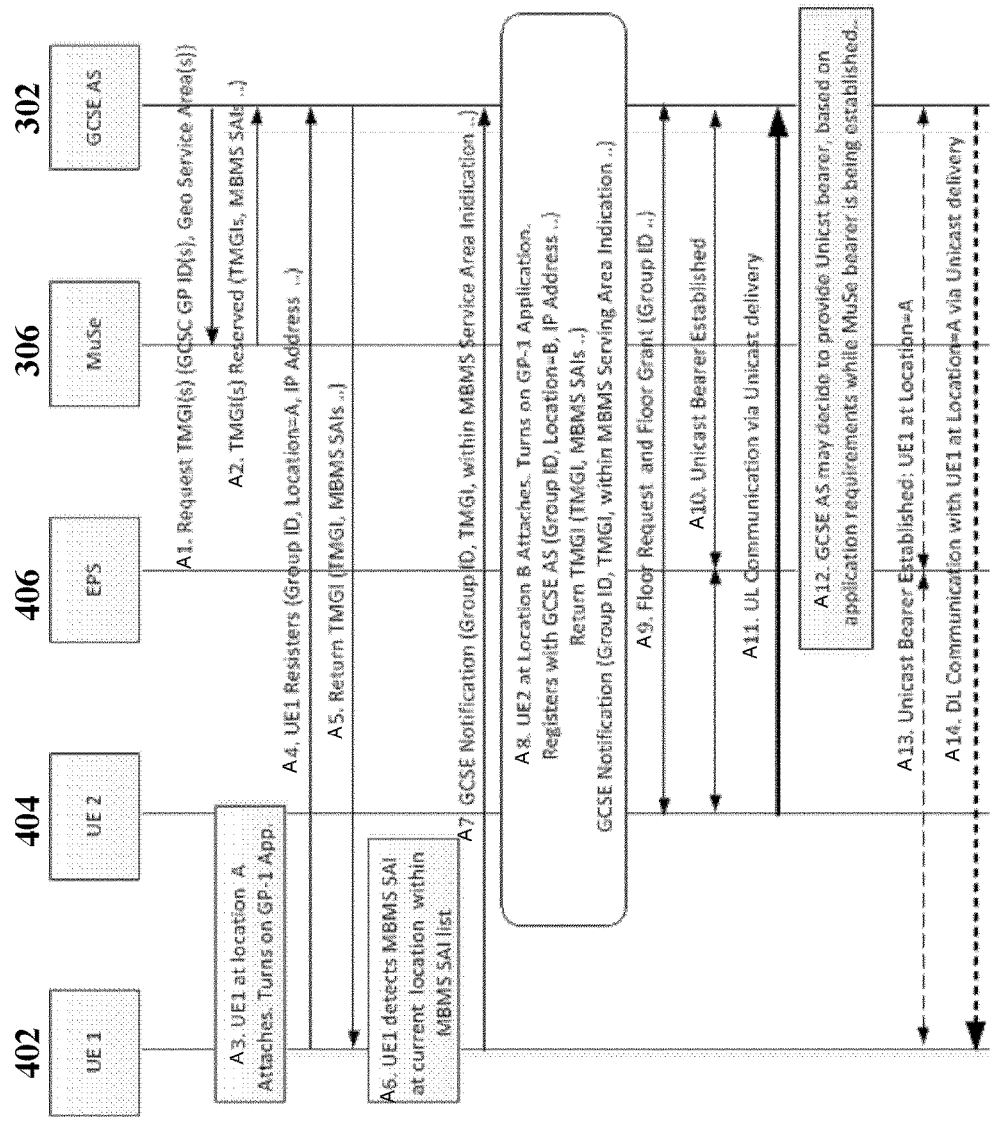
FIGS. 4A-4B illustrate a signal flow example in a wireless network offering configurable group communication services.
Figure 4B:
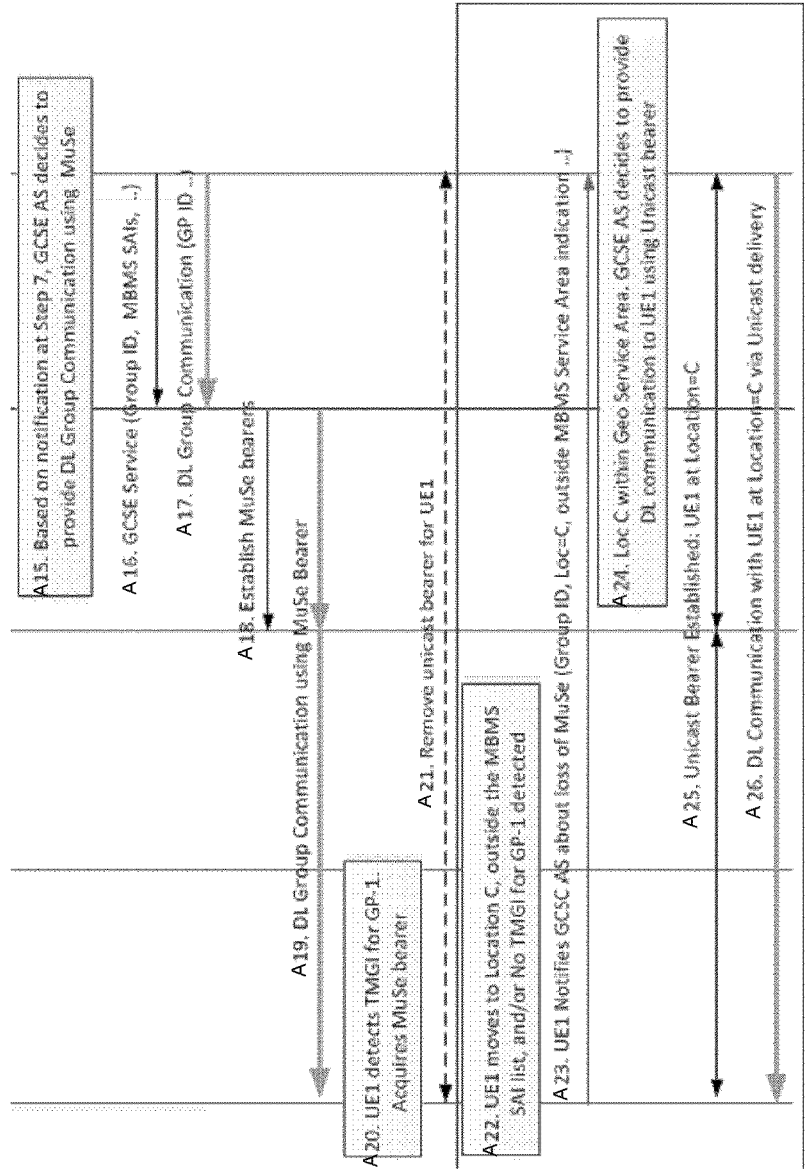

With reference to FIG. 4A and FIG. 4B, techniques for supporting the following capabilities are further described.

The signal exchanges depicted in FIGS. 4A and 4B provide the capability to the Users to configure Geo Service Areas for each GCSE Group within which group communication services are to be provided. It is also possible for the Users to reconfigure the Geo Service Areas for the GCSE Group(s). The signal exchanges occur among the following entities: UE1 402 and UE2 404, which represent two different UEs in the network, EPS 406, e.g., as previously described, MuSE 306 and GCSE AS 302.

The geographic scope for each GCSE group may be agreed to between the Users (such as Public Safety, Dispatch Services) and the GCSE AS 302 provider as part of the subscription for the GCSE group.

The GCSE AS 302 providers may have a relationship with the 3GPP system operator whereby Geo Service Areas have a predefined mapping with the corresponding 3 GPP EPS MBMS Service Areas, such as in terms of the lists of MBMS Service Areas. For example, a Geo Service Area may comprise of sub-Areas A, B, C . . . , each of which is pre-mapped to a corresponding List A, List B, List C of MBMS Service Area Identities (MBMS SATs).

The mapping of Geo Service Areas to the 3GPP EPS specific MBMS Service Areas is done by appropriate configurations within the EPS, for example at the HSS (home subscriber server) and/or at the PCRF (Policy Charging and Rules Function) entities. Such configurations ensure that MBMS Service Areas are not larger than the corresponding Geo Service Areas. With reference to FIG. 4A, the following example operations have been depicted.

(A1-A2): When requesting 3GPP EPS MBMS transmission identifier for group communication, such as the TMGIs for GCSE Group(s) from the MuSe/MBMS function, the GCSE AS 302 includes the Geo Service Area(s) for the respective GCSE Group (s) also in the request message. The mapping of Geo Service Area(s) to the corresponding MBMS Service Area(s) and associated TMGI(s) are made available to the GCSE AS 302 by the 3GPP EPS 406. The GCSE AS 302 maintains such mapping of the GCSE Group IDs with their associated TMGIs and MBMS Service Areas(s) e.g., in the terms of the lists of MBMS SAIs.

(A3-A4): After a UE1 402 attaches to the EPS 406, it turns on a GCSE application and registers with the GCSE AS 302. In addition to sending the GCSE Group ID to the GCSE AS, the UE1 402 includes its location information also in the registration message. The location information passed by the UE1 402 to the GCSE AS 302 can be in terms of Geo Area A, Area B etc. that is understood by the GCSE AS. It is assumed that the GCSE Group ID(s) corresponding to the GCSE Application(s) is preconfigured at the UE 304.

(A5): The GCSE validates that the requesting UE 304 is located within the allowed Geo Service Area before returning the TMGIs for the GCSE Group(s) and the associated MBMS Service Area information to the UE1 402. In addition to saving the TMGIs for the GCSE Group(s), the UE 304 saves the associated MBMS Service Area information also. This way, the UE1 402 can know when it moves out of the configured MBMS Service Area.

The validation of the location of the registering UE1 402 by the GCSE AS 302 ensures that the Transmitting and the Receiving Members are within the configured Geo Service Area.

If the Geo Service Area(s) of a GCSE Group(s) is reconfigured, the GCSE AS updates its cached mapping of the new Geo Service Area(s) to the respective new MBMS Service Area(s) by performing the TMGI request procedure again with the MuSe/MBMS function. The GCSE AS pushes such new/updated MBMS Service Area(s) information to all registered GCSE Group Members using the procedure such as those described in A5.

(A6-A7): UE1 402 reads the TMGI Information transmitted by the 3GPP EPS (such as by the LTE Base Stations) and determines that it is currently located within the MBMS Service Area for the GCSE Group of interest. The UE1 402 notifies GCSE AS 302 accordingly, by including the TMGI read from 3GPP EPS transmissions, and "within MBMS Service Area indication . . . " indicating that it is within the MBMS service area.

(A8): UE2 404 at location B attaches and turns on the same Application as used by UE1 402 and identified by GCSE Group ID (Group-1). UE2 404 registers with GCSE AS for this GCSE Group ID and informs GCSE AS 302 of its location also. The GCSE AS 302 validates that the requesting UE is located within the Geo Service Area and returns TMGIs for the identified GCSE Group ID and the associated MBMS Service Area information to UE2 404. UE2 404 determines that it is currently located within the MBMS service area for the GCSE Group of interest and notifies GCSE AS accordingly.

(A9, A10, A11): UE2 404 makes a floor request for initiating group communication for the GCSE Group of Interest (e.g., Group-1). Knowing that UE2 404 is located within the configured Geo Service Area, the request is granted and unicast bearer is established, as needed, between the GCSE AS and the UE2 404 via 3GPP EPS. UL group communication happens via this unicast bearer.

(A12, A13, A14): Instead of pre-establishing the MBMS bearers over the complete MBMS Service Area(s) as are required by the currently known GCSE group communication procedures; this invention does not propose such pre-established MBMS bearers. The GCSE AS 302 can provide DL communications to the UEs via unicast bearers till such time that MBMS bearers are established and acquired by the respective UEs.

The time taken for the setting up the MBMS bearers, the nature of the applications, latency requirements, number of receiving members etc. can be the factors for consideration by the GCSE AS for making the decision about when to set up the MBMS bearers.

(A15): Knowing that UE1 402 is within the MBMS Service Area for the GCSE Group of interest (e.g., Group-1) from A7, and other factors such as the number of registered users within the same MBMS Service Area etc., the GCSE AS decides to provide DL Group Communication via MuSe/MBMS function using multicast bearers.

(A16, A17, A18): Once the GCSE AS 302 decides to provide DL Group Communications via MuSe function 306; the GCSE AS 302 passes MBMS Service Area information (e.g., list of MBMS Service Area Identities) where MBMS based services are to be provided to the MuSe function 306 via the GC2 reference point. The MBMS Service Area information ensures that DL MBMS based Group Communication is restricted to a geographic area of interest.

(A19): The 3GPP EPS sets up MBMS bearers in the MBMS Service Areas identified by the list of MBMS Service Area Identifiers received from GCSE AS 302. 3GPP EPS begins broadcasting the availability of DL group communication transmission for the GCSE Group (e.g., Group-1) identified by the associated TMGIs in the desired MBMS Service Areas. DL group communication transmission also begins.

(A20, A21): UE1 402 (at location A) detects TMGI for the GCSE Group of interest (e.g., Group 1) and acquires DL MBMS bearer. Unicast bearer, if assigned to UE1 402 at A13, is removed.

(A22, A23, A24) When a UE moves to a new location and determines that it is out of the MBMS Service Area, the UE notifies the GCSE AS 302 of its new location and "loss of MBMS transmission indication . . . " for the GCSE Group of interest. On verifying that the UE at the new location is still within its configured Geo Service Area or that the UE is authorized to continue in this group communication from the new location, the GCSE AS can decide to provide DL group communication using unicast bearer(s).

If the GCSE AS 302 determines that UE at the new location has moved outside the Geo Service Area; such information can be used by the GCSE AS for generating Notification to the requesting entities, informing that the UE (group member) has left group's Service Area.

(A25, A26) GCSE AS establishes unicast bearer (as needed) with UE1 402 via 3GPP EPS. DL group communication for GCSE Group (e.g., Group-1) continues via this unicast bearer.

Group Communication With Geographic Service Area Override and Filtering

Figure 5:
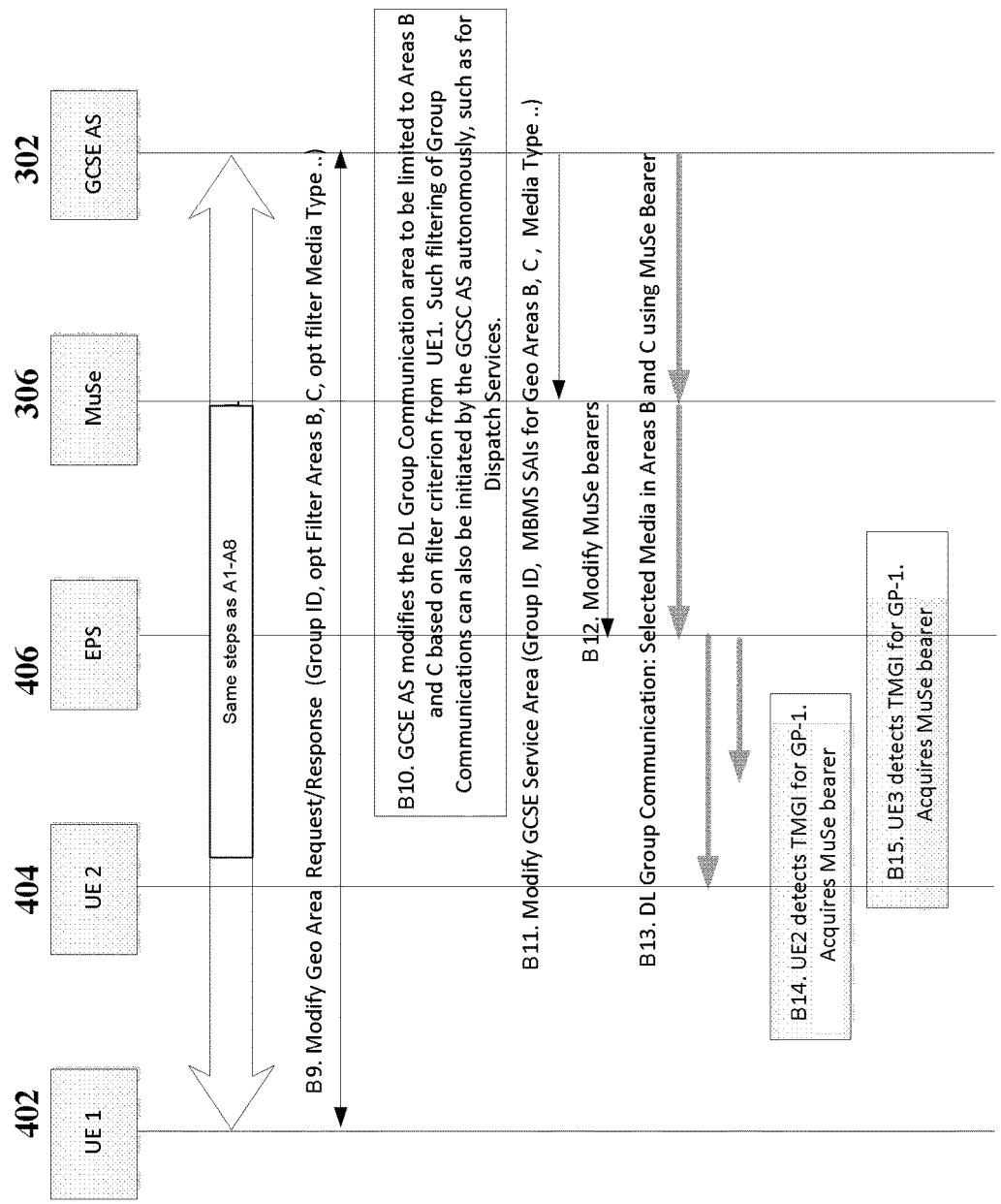
FIG. 5 illustrates another signal flow example in a wireless network offering configurable group communication services.

With reference to FIG. 5, example methods for supporting the following capabilities are depicted. These methods are in addition to the GCSE group communication procedures known at this time of writing this invention:

It is possible for the system to override geographic area restrictions for a GCSE Group for a particular Group Communication transmission for its Receiving Members. In order to perform such override, a Transmitting Member initiates Modify Geo Area Request that includes parameters such as "override location:abc", to the GCSE AS 302. Alternatively, such "override" request can be initiated by the "dispatcher" entity at the GCSE AS 302.

The system also provides a mechanism to restrict a particular group communication to a sub-geo area within the geographical scope of that group. In this case only the Receiving Members that are within the sub-geo area receive the group communication. Such restriction for Receiving within a sub-geo-area can be initiated by the "dispatcher" entity at the GCSE AS 302 also.

(B1, B2, B3, B4, B5, B6, B7, B8) Generally similar to A1 to A8, respectively.

(B9, B10, B11): In the Modify Geo Area Request signaling to the GCSE AS 302, the UE1 402 includes parameters such as "Filter Areas: B, C" asking for the following instances of group communication transmissions to be limited to Geo Areas B and C only. The request may include filter-Media Type(s) information also indicating the types of the media that need to be delivered in the limited Geo Area(s). On validating that the UE1 402 is authorized to make such a request, and that Geo Areas B and C are a subset of the Geo Service Area for this Group, the request is granted.

For the case of overriding the geographic area restrictions, the UE includes parameters such as "Override location:abc" in the Modify Geo Area Request signaling to the GCSE AS. On validating that the UE is authorized to make such an override request at the location identified by "override location:abc:, the request is granted. Such "override" procedure is not detailed in the illustration above.

(B12): The GCSE AS 302 decides to provide DL group communication within the filtered-Geo Service Area (Geo Areas B and C) based on filter criterion received from the UE. Alternatively, the GCSE AS 302 may apply geographic filtering on specific instances of group communication based on local policy. Such DL group communication within "filtered Geo areas" can also be initiated by the GCSE AS autonomously, such as by the "dispatcher" entity for Dispatch Services. Knowing that the UEs are registered within the filtered Geo Area, and other factors such as number of registered users etc., the GCSE AS 302 decides to provide DL Group Communication via MuSe.

(B13): The GCSE AS 302 passes MBMS Service Area information for Geo Areas B and C (e.g., list of MBMS Service Area Identities for Geo Areas B and C) where MBMS based services are to be provided and the desired Media Type information, to the MuSe function 306 via the GC2 reference point.

(B14, B15) The 3GPP EPS sets up MBMS bearers in the MBMS Service Areas identified by the list of MBMS Service Area Identifiers received from GCSE AS 302. 3GPP EPS begins broadcasting the availability of DL group communication transmission for the GCSE Group (e.g., Group-1) identified by the associated TMGIs in the desired MBMS Service Areas. DL group communication transmission also begins.

(B16, B17): UE2 404 (at location B) detects TMGIs for the GCSE Group of interest (e.g., Group 1) and acquires DL MBMS bearers. Similarly, UE3 (at location C, not shown in the drawing) detects TMGIs for the GCSE Group of interest (e.g., Group 1) and acquires DL MBMS bearers.

Figure 6:
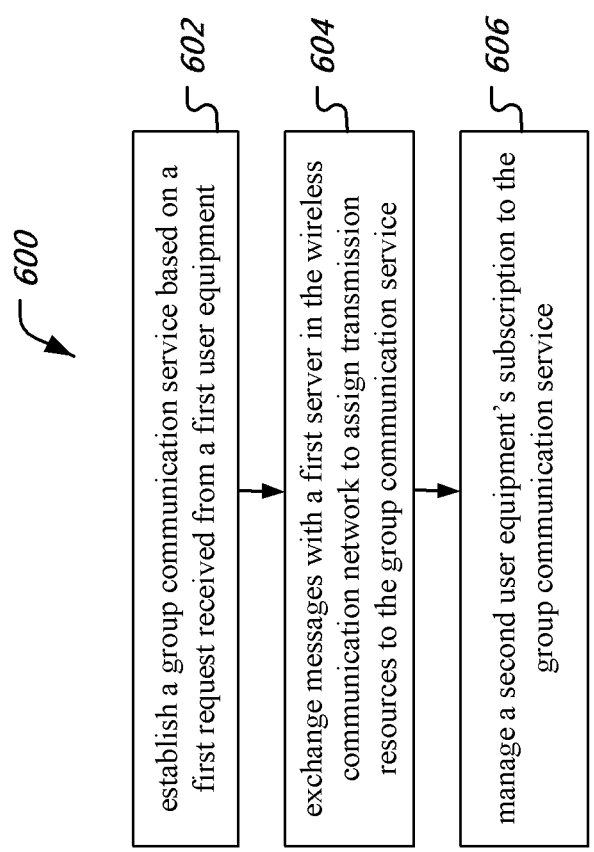
FIG. 6 is a flow chart representation of a process of wireless group communication.

FIG. 6 is a flowchart representation of a method 600 of facilitating group communication services in a wireless network. The method 600 may be implemented, at the network-side, e.g., at the GCSE AS 302.

At 602, the method 600 establishes a group communication service based on a first request received from a first user equipment. The establishment of the group communication service is responsive to a geographic information associated with the request. In some embodiments, the geographic information associated with the request includes a location of the first user equipment, e.g., geographic coordinates, the identity of the base station providing radio access to the UE, and so on.

In some embodiments, as previously discussed, the user equipment may provide the location information in the group communication request. In some embodiments, the geographic information associated with the request may include a region, e.g., a postal code, or a human-understandable description (e.g., "Northern Ohio"). In some embodiments, the method 600 may obtain a requesting UEs geographic location by communicating with another server in the wireless network.

At 604, the method 600 exchanges messages with a first server in the wireless communication network to assign transmission resources to the group communication service. As previously discussed, a MuSe function may be present in the wireless network and may assign MBMS resources to group communication. The requested and assigned services may include unicast transmission resources in cells in which only one mobile device is a part of the group communication service and multicast transmission resources in cells where multiple mobile devices are a part of the group communication service.

At 606, the method 600 manages a second user equipment's subscription to the group communication service. In some embodiments, second (and subsequent) UEs can join the group communication service only by going through the admission process controlled by method 600 (e.g., GCSE as previously described). As previously described, upon admission or exit of UEs from a group communication service, or as participating UEs move from coverage of one base station to another, the method 600 may accordingly adjust the transmission resources to either allocate additional resources (e.g., when a new UE joins or when an existing UE enters a new cell), consolidate resources (e.g., change from unicast to multicast when number of UEs in a given cell increases) or free up resources (e.g., when a UE leaves the group or leaves a cell).

Figure 7:
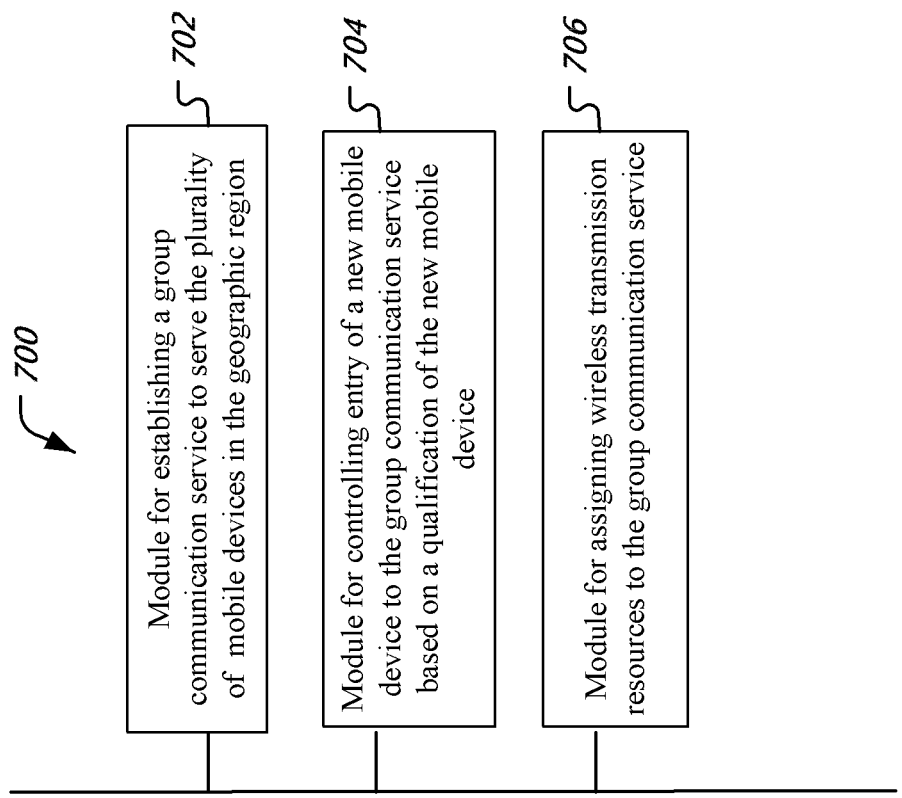
FIG. 7 is a block diagram representation of an apparatus that implements wireless group communications.

FIG. 7 is a block diagram representation of an apparatus 700 for facilitating group communication service in a communication network.

The module 702 is for establishing a group communication service to serve the plurality of mobile devices in the geographic region.

The module 704 is for controlling entry of a new mobile device to the group communication service based on a qualification of the new mobile device.

The module 706 is for assigning wireless transmission resources to the group communication service.

The apparatus 700 and modules 702, 704 and 706 may further be configured to implement some techniques disclosed in this document.

It will be appreciated that group communication techniques are described which allow mobile devices in a given geographic neighborhood to communicate with each other as a group by minimizing the amount of transmission resources used. A hardware and/or software entity in the network controls the access to the group by users.

It will further be appreciated that the transmission resources used by the group communication are dynamically adjusted based on mobile devices joining and leaving the group and roaming from one cell to another.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method implemented at a network-side server in a wireless communication network, the method comprising:
   receiving a first message from a first user equipment, wherein the first message is associated with a geographic information of the first user equipment;
   establishing a group communication service in response to the geographic information associated with the first message;
   transmitting, based on a predefined mapping between a geographic service area covered by the group communication service and one or more Multimedia Broadcast/Multicast Service (MBMS) service areas, an identification of the geographic service area indicated by the geographic information of the first user equipment and information of a corresponding MBMS service area;

exchanging messages with a first server in the wireless communication network to assign transmission resources to the group communication service;
providing the group communication service to the first user equipment;
providing, when the corresponding MBMS service area changes, updated information of the corresponding MBMS service area to the first user equipment to enable the first user equipment to determine when the first user equipment moves outside of the corresponding MBMS service area;
determining, based on a notification from the first user equipment indicating that the first user equipment moves outside of the corresponding MBMS service area, that the first user equipment also moves outside of the geographic service area covered by the group communication service; and
transmitting, upon requested by a requesting entity, a notification to the requesting entity indicating that the first user equipment has moved outside of the geographic service area.

2. The method of claim 1, wherein the geographic information associated with the first message comprises a location of the first user equipment.

3. The method of claim 1, wherein the geographic information associated with the first message is included in the first message by the first user equipment.

4. The method of claim 1, further comprising:
receiving a second message from a second user equipment to subscribe to the group communication service;
allowing, when the second user equipment is within the geographic service area, the second user equipment to subscribe to the group communication service; and
providing the group communication service to the allowed second user equipment.

5. The method of claim 4, further comprising:
rejecting, when the second user equipment is outside the geographic service area, the second user equipment's subscription to the group communication service.

6. The method of claim 4, further comprising:
allowing, when the second user equipment is outside the geographic service area, the second user equipment's subscription to the group communication service, only when the second message includes an override command.

7. The method of claim 1, further comprising:
communicating with a second server to obtain the geographic information associated with the first message.

8. The method of claim 1, further including:
adjusting the assigned transmission resources to include multicast transmission resources of a cell, when multiple user equipment in the cell are subscribing to the group communication service.

9. The method of claim 1, wherein the transmission resources comprise a multimedia broadcast multicast service (MBMS) channel assigned to the group communication service.

10. An apparatus, comprising:
a memory storing code; and
a processor that reads the code from the memory and implements a method comprising:
receiving a first message from a first user equipment, wherein the first message is associated with geographic information of the first user equipment;
establishing a group communication service in response to the geographic information associated with the first message;
transmitting, based on a predefined mapping between a geographic service area covered by the group communication service and one or more Multimedia Broadcast/Multicast Service (MBMS) service areas, an identification of the geographic service area indicated by the geographic information of the first user equipment and information of a corresponding MBMS service area;
exchanging messages with a first server in the wireless communication network to assign transmission resources to the group communication service;
providing the group communication service to the first user;
providing, when the corresponding MBMS service area changes, updated information of the corresponding MBMS service area to the first user equipment to enable the first user equipment to determine when the first user equipment moves outside of the corresponding MBMS service area;
determining, based on a notification from the first user equipment indicating that the first user equipment moves outside of the corresponding MBMS service area, that the first user equipment also moves outside of the geographic service area covered by the group communication service; and
transmitting, upon requested by a requesting entity, a notification to the requesting entity indicating that the first user equipment has moved outside of the geographic service area.

11. The apparatus of claim 10, wherein the geographic information associated with the first message comprises a location of the first user equipment.

12. The apparatus of claim 10, wherein the geographic information associated with the first message is received in the first message by the first user equipment.

13. The apparatus of claim 10, wherein the processor-implemented method further includes:
receiving a second message from a second user equipment to subscribe to the group communication service;
allowing, when the second user equipment is within the geographic service area, the second user equipment to subscribe to the group communication service; and
providing the group communication service to the allowed second user equipment.

14. The apparatus of claim 13, wherein the processor-implemented method further includes:
rejecting, when the second user equipment is outside the geographic services area, the second user equipment's subscription to the group communication service.

15. The apparatus of claim 13, wherein the processor-implemented method further includes:
allowing, when the second user equipment is outside the geographic service area, the second user equipment's subscription to the group communication service, only when the second message includes an override command.

16. The apparatus of claim 10, wherein the processor-implemented method further includes:
communicating with a second server to obtain the geographic information associated with the first message.

17. The apparatus of claim 10, wherein the processor-implemented method further includes:
adjusting the assigned transmission resources to include multicast transmission resources of a cell, when multiple user equipment in the cell are subscribing to the group communication service.

18. The apparatus of claim 10, wherein the transmission resources comprise a multimedia broadcast multicast service (MBMS) channel assigned to the group communication service.

19. A communication system, comprising:
a plurality of mobile devices in a geographic service area; and
a group communication service enabler (GCSE) configured to:
  establish a group communication service to serve the plurality of mobile devices in the geographic service area;
  provide each of the plurality of mobile devices, based on a predefined mapping between the geographic service area covered by the group communication service and one or more Multimedia Broadcast/Multicast Service (MBMS) service areas, an identification of the geographic service area and information of a corresponding MBMS service area;
  control entry of a new mobile device to the group communication service based on a qualification of the new mobile device;
  assign wireless transmission resources to the group communication service;
  provide, when the corresponding MBMS service area changes, updated information of the corresponding MBMS service area to a mobile device to enable the mobile device to determine when the mobile device moves outside of the corresponding MBMS service area;
  determine, based on a notification from the mobile device indicating that the mobile device moves outside of the corresponding MBMS service area, that the mobile device also moves outside of the geographic service area covered by the group communication service; and
  transmit, upon requested by a requesting entity, a notification to the requesting entity indicating that the mobile device has moved outside of the geographic service area.

20. The communication system of claim 19, wherein the GCSE is further configured to:
allow a requesting mobile device to join the group communication service as a receiver or a transmitter only when the requesting mobile device is operating in the geographic service area.

21. The communication system of claim 19, wherein the GCSE is further configured to:
allow a requesting mobile device operating outside the geographic service area to join the group communication service as a receiver or a transmitter only when the requesting mobile device presents credentials to override a geographic restriction of the group communication service.

22. The system of claim 19, wherein each of the plurality of mobile devices is configured to:
transmit a message to the GCSE for requesting the group communication service, the message including a geographic information of the mobile device;
receive an identification of a geographic service area indicated by the geographic information of the mobile device and information of a corresponding MBMS service area;
perform group communication using the group communication service; and
transmit, upon moving to a second MBMS service area in the geographic service area, a notification to the GCSE to inform the GCSE of a geographic location indicative of the second MBMS service area.

* * * * *